US012013506B2

(12) United States Patent
Mohideen (10) Patent No.: US 12,013,506 B2
(45) Date of Patent: Jun. 18, 2024

(54) DRONE GEOPHONE INSTALLATION ARRANGEMENT (71) Applicant: Farlin Anooz Mohideen, Belmont (AU)

(72) Inventor: Farlin Anooz Mohideen, Belmont (AU)

(*) Notice: Subject to any disclaimer, the term of this patent is extended or adjusted under 35 U.S.C. 154(b) by 0 days.

(21) Appl. No.: 18/251,517

(22) PCT Filed: Jul. 26, 2022

(86) PCT No.: PCT/AU2022/050785
§ 371 (c)(1),
(2) Date: May 2, 2023

(87) PCT Pub. No.: WO2023/015334
PCT Pub. Date: Feb. 16, 2023

(65) Prior Publication Data
US 2023/0393293 A1 Dec. 7, 2023

(30) Foreign Application Priority Data
Aug. 9, 2021 (AU) ................. 2021902458

(51) Int. Cl.
G01V 1/16 (2006.01)
B64D 1/22 (2006.01)
(Continued)

(52) U.S. Cl.
CPC ............ G01V 1/168 (2013.01); B64D 1/22 (2013.01); B64U 10/14 (2023.01); G01V 1/20 (2013.01); B64U 2101/60 (2023.01)

(58) Field of Classification Search
CPC . G01V 1/168; G01V 1/20; G01V 1/18; G01V 1/181; G01V 1/184; G01V 1/189;
(Continued)

(56) References Cited
U.S. PATENT DOCUMENTS 6,002,648 A * 12/1999 Ambs ................. G01V 1/02
181/170
6,148,952 A * 11/2000 Johnston .............. G01V 1/135
181/120
(Continued)

OTHER PUBLICATIONS

Stewart, An unmanned aerial vehicle with vibration sensing ability (seismic drone); https://doi.org/10.1190/segam2016-13973407.1 (Year: 2016).*
(Continued)

Primary Examiner — Daniel L Murphy
Assistant Examiner — Amie M Ndure
(74) Attorney, Agent, or Firm — TraskBritt (57) ABSTRACT A drone geophone installation arrangement comprising a drone configured to transport a geophone, and an anchor arrangement configured to selectively and releasably anchor the drone to a surface. Also included is a geophone implantation assembly configured to implant the geophone into the surface, the implantation assembly comprising i) a geophone receptacle configured to releasably receive the geophone, ii) a translation carriage configured to urge the geophone receptacle into the surface, and iii) a pulsator configured to apply at least one implantation pulse to the geophone receptacle to facilitate implantation of the geophone into the surface while the drone is anchored thereto. An associated geophone installation method is also described.

16 Claims, 6 Drawing Sheets (51) Int. Cl.
  *B64U 10/14* (2023.01)
  *G01V 1/20* (2006.01)
  *B64U 101/60* (2023.01)

(58) Field of Classification Search
  CPC ... G01V 1/22; G01V 1/24; G01V 1/28; G01V 7/00; G01V 8/00; G01V 15/00; G01V 99/00; G01V 2200/00; G01V 2210/00; B64U 10/14; B64U 2101/60; B64U 10/00; B64U 10/20; B64U 10/10; B64U 10/40; B64U 10/30; B64U 10/25; B64U 10/60; B64U 10/50; B64U 10/70; B64U 10/80; B64U 40/10; B64U 40/20; B64U 2201/10; B64U 2201/20; B64D 1/22; H04W 4/00; H04W 8/00; H04W 4/02; H04W 4/38; B64F 1/00; B64F 1/007; B64F 5/60; B64F 1/222; B64F 1/32; B64F 3/02; B64F 1/362; B64F 1/36; B64F 1/22; B64F 1/12; B64F 5/10; B64F 1/18; B64F 1/04; B64F 1/125; B64F 1/02; B64F 1/20; B64F 3/00; B64F 1/06; B64F 1/364; B64F 5/40; B64F 1/005; B64F 5/00; B64F 1/029; B64F 1/10; B64F 1/027; B64F 1/28; B64F 1/0299; B64F 5/30; B64F 1/14; B64F 1/0295; B64F 1/0297; B64F 1/368; B64F 1/24; B64F 1/30; B64F 1/322; G06K 19/0723; G06K 7/10297; G06K 19/06037; G06K 7/10366; G06K 7/1413; G06K 7/1417; G06K 19/06028; G06K 7/10722; G06K 19/0712; G06K 7/10; G06K 7/10821; G06K 17/0022; G06K 19/07758; G06K 19/06009; G06K 17/00; G06K 19/0717; G06K 7/10316; G06K 7/10861; G06K 7/0008; G06K 7/10009; G06K 7/10376; G06K 19/0708; G06K 7/1404; G06K 19/06; G06K 17/0029; G06K 7/10425; G06T 17/05; G06T 19/003; G01C 15/002; G06F 3/011; G06Q 10/06315; E21B 49/04; E21B 7/26; E21B 2200/20; E21B 49/005; E21B 49/001
  USPC .......................................................... 367/37
  See application file for complete search history.

(56) References Cited

U.S. PATENT DOCUMENTS

| | | | | |
|---|---|---|---|---|
| 2005/0120813 | A1* | 6/2005 | Clark | G01N 3/40 73/866.5 |
| 2009/0058201 | A1* | 3/2009 | Brennvall | H02K 33/16 310/31 |
| 2011/0251968 | A1* | 10/2011 | Parker | G06Q 50/265 705/317 |
| 2011/0304284 | A1* | 12/2011 | Magali | B06B 1/12 318/126 |
| 2013/0308426 | A1 | 11/2013 | Scarlatti et al. | |
| 2014/0078865 | A1* | 3/2014 | Coste | G01V 1/223 367/76 |
| 2014/0307525 | A1* | 10/2014 | Postel | G01V 1/24 367/37 |
| 2019/0292745 | A1* | 9/2019 | Arntz | E02D 7/28 |
| 2020/0183029 | A1* | 6/2020 | Clement | A01C 14/00 |

OTHER PUBLICATIONS

Stewart et al. "An Unmanned Aerial Vehicle With Vibration Sensing Ability (Seismic Drone)" Society of Exploration Geophysicists International Exposition and 86th Annual Meeting (SEG Dallas 2016), Dallas, Texas, USA, Oct. 16-21, 2016, p. 225-229.

* cited by examiner

DRONE GEOPHONE INSTALLATION ARRANGEMENT

CROSS-REFERENCE TO RELATED APPLICATIONS

This application is a national phase entry under 35 U.S.C. § 371 of International Patent Application PCT/AU2022/050785, filed Jul. 26, 2022, designating the United States of America and published as International Patent Publication WO 2023/015334 A1 on Feb. 16, 2023, which claims the benefit under Article 8 of the Patent Cooperation Treaty to Australian Patent Application Serial No. 2021902458, filed Aug. 9, 2021.

TECHNICAL FIELD

This disclosure broadly relates to the field of geophysics and more specifically to a drone geophone installation arrangement and associated geophone installation method.

BACKGROUND

The following discussion of the background art is intended to facilitate an understanding of the disclosure only. The discussion is not an acknowledgement or admission that any of the material referred to is or was part of the common general knowledge as at the priority date of the disclosure.

As is known in the art, a geophone is an acoustic detector device that converts ground movement or vibrations into an electrical signal, which can be analyzed for seismic information.

Geophones are often used in reflection seismology to record the energy waves reflected by subsurface geology. Geophones are typically very sensitive devices that can respond to distant ground tremors. These small signals can be drowned by larger signals from sources local to the geophone. For this reason, geophones are typically deployed in an array over a geographic area, so that it is possible to recover small signals by correlating signals from several geophones.

Signals that are registered only at one or some of the geophones in the array can generally be attributed to unwanted, local events and thus discarded. However, it can be assumed that small signals that register uniformly at all geophones in the array can be attributed to a distant and therefore significant event.

A shortcoming in the art of deploying geophones has been identified, such as in an array comprising a plurality of geophones, over a desired geographic area, which can be an arduous and time-consuming task, particularly where the geographic area is inaccessible, inhospitable and/or difficult to navigate. The current disclosure was conceived with this shortcoming in mind.

BRIEF SUMMARY

The skilled addressee is to appreciate that reference herein to a "drone" broadly includes reference to any suitable unmanned vehicle, such as an aircraft or land vehicle, that may be guided remotely and/or operate autonomously to reach a particular geographic location with a predetermined load or cargo, typically at least one geophone.

According to a first aspect of the disclosure there is provided a drone geophone installation arrangement comprising:
 a drone configured to transport a geophone;
 an anchor arrangement configured to selectively and releasably anchor the drone to a surface; and
 a geophone implantation assembly configured to implant the geophone into the surface, the implantation assembly comprising a:
  i) a geophone receptacle configured to releasably receive a geophone;
  ii) a translation carriage configured to urge the geophone receptacle into the surface; and
  iii) a pulsator configured to apply at least one implantation pulse to the geophone receptacle to facilitate implantation of the geophone into the surface while the drone is anchored thereto, after which the geophone is released from the receptacle and the drone is able to depart.

Typically, the installation arrangement comprises a controller arranged in signal communication with the anchor arrangement and the geophone implantation assembly, the controller configured to control synergistic operation of the arrangement and assembly to control implantation of the geophone into the surface.

Typically, the processor comprises any suitable processor or microcontroller configured to receive input, perform logical and arithmetical operations on a suitable instruction set, and provide output, as well as transitory and/or non-transitory electronic storage.

In an embodiment, the drone comprises a multicopter, such as a quadcopter.

In an embodiment, the anchor arrangement comprises a deployable drill fast with the drone and configured to deploy and drill a drill bit into the surface in order to anchor the drone to the surface.

Typically, the drill is configured to drill the drill bit at an angle into the surface relative to a direction in which the implantation pulse is applied in order to facilitate anchoring the drone to the surface during geophone implantation.

In an embodiment, the implantation pulse is applied substantially vertically and the drill angle is between 300 and 60° from the vertical.

In an embodiment, the geophone receptacle comprises a geophone socket shaped and configured to receive a portion of the geophone, the socket including a lock configured to releasably lock the portion into the socket.

In an embodiment, the translation carriage comprises a linear actuator suspended below the drone and having a predetermined translation distance determined by means of limit switches and/or sensors.

In an embodiment, the translation carriage is configured to lower the geophone receptacle onto the surface until a predetermined amount of resistance to translation occurs.

In an embodiment, the pulsator is configured to activate once the predetermined amount of resistance to translation occurs.

In an embodiment, the pulsator comprises a solenoid actuator configured to apply the at least one implantation pulse once activated.

In an embodiment, the translation carriage is configured to lower the geophone receptacle onto the surface until the predetermined amount of resistance to translation occurs after each activation of the pulsator, until a maximum translation distance is reached.

Typically, the geophone receptacle is configured to release the geophone once the maximum translation distance is reached.

Typically, the translation carriage is configured to retract to a minimum translation distance after the geophone is released from the geophone receptacle.

Typically, the anchor assembly is configured to release the drone from the surface after the geophone is released from the geophone receptacle following implantation.

According to a second aspect of the disclosure there is provided a geophone installation method comprising the steps of:
  providing a drone configured to transport a geophone;
  selectively and releasably anchoring the drone to a surface by means of an anchor arrangement;
  urging the geophone into the surface via a translation carriage having a geophone receptacle in which the geophone is received;
  applying at least one implantation pulse via a pulsator to the geophone receptacle as the geophone receptacle is urged into the surface while the drone is anchored; and
  releasing the geophone from the geophone receptacle once implanted so that the drone is able to depart.

In an embodiment, the drone comprises a multicopter, such as a quadcopter.

In an embodiment, the step of anchoring the drone comprises deploying a drill fast with the drone and drilling a drill bit into the surface in order to anchor the drone to the surface.

Typically, the step of drilling is performed at an angle relative to a direction in which the implantation pulse is applied in order to facilitate anchoring the drone to the surface during geophone implantation.

In an embodiment, the implantation pulse is applied substantially vertically and the drill angle is between 300 and 60° from the vertical.

In an embodiment, the step of urging via the translation carriage is performed by a linear actuator suspended below the drone and having a predetermined translation distance determined by means of limit switches.

In an embodiment, the step of urging is performed via the translation carriage lowering the geophone receptacle onto the surface until a predetermined amount of resistance to translation occurs.

In an embodiment, the step of applying at least one implantation pulse is performed by the pulsator activating once the predetermined amount of resistance to translation occurs.

In an embodiment, the step of urging is performed by the translation carriage lowering the geophone receptacle onto the surface until the predetermined amount of resistance to translation occurs after each activation of the pulsator, until a maximum translation distance is reached.

Typically, the step of releasing the geophone from the geophone receptacle is performed by the geophone receptacle releasing the geophone once the maximum translation distance is reached, the geophone receptacle comprising a geophone socket shaped and configured to receive a portion of the geophone and including a lock configured to releasably lock the portion into the socket.

Typically, the method includes the step of retracting the translation carriage to a minimum translation distance after the geophone is released from the geophone receptacle.

Typically, the method includes the step of the anchor assembly releasing the drone from the surface after the geophone is released from the geophone receptacle.

In an embodiment, the method includes the step of retrieving the implanted geophone by the drone returning thereto and anchoring the drone with the anchor arrangement, receiving the geophone into the geophone receptacle, translating the translation carriage with geophone from the maximum to minimum translation distance, and releasing the drone from the surface so that the drone is able to depart with the geophone.

According to a third aspect of the disclosure there is provided a method of installing a geophone comprising the step of implanting a geophone with a drone geophone installation arrangement in accordance with the first aspect of the disclosure above.

According to a further aspect of the disclosure there is provided a drone geophone installation arrangement and a geophone installation method, substantially as herein described and/or illustrated.

BRIEF DESCRIPTION OF THE DRAWINGS

The description will be made with reference to the accompanying drawings in which.

DETAILED DESCRIPTION

Further features of the disclosure are more fully described in the following description of several non-limiting embodiments thereof. This description is included solely for the purposes of exemplifying the disclosure to the skilled addressee. It should not be understood as a restriction on the broad summary, disclosure or description of the disclosure as set out above.

In the figures, incorporated to illustrate features of the example embodiment or embodiments, like reference numerals are used to identify like parts throughout. Additionally, features, mechanisms and aspects well-known and understood in the art will not be described in detail, as such features, mechanisms and aspects will be within the understanding of the skilled addressee.

With reference now to the accompanying figures, there is broadly shown one embodiment of a drone geophone installation arrangement 10. Such an arrangement 10 finds particular application in the installation and implantation of a geophone at a desired geographic location, as is known in the art of geophysics. Drone geophone installation arrangement 10 generally comprises drone 8, an anchor arrangement 14, and a geophone implantation assembly 18 to facilitate implantation of a geophone 12 into a surface 16. Such a surface 16 typically comprises a ground surface at a desired geographic location.

As mentioned above, while the exemplified embodiment shows the drone 8 as a multicopter, such as a quadcopter, the skilled addressee is to appreciate that other forms or drones are apposite, as required. For example, land vehicles may also be used, or the like. Accordingly, drone 8 may include any suitable drone configured to transport a geophone 12.

The skilled addressee is to appreciate that arrangement 10 typically includes some manner of controller (not shown) which is arranged in signal communication with the anchor arrangement 14 and the geophone implantation assembly 18 and is configured to control synergistic operation of these components to control implantation of the geophone 12 into the surface 16, as described below. Such a controller may include any suitable microcontroller or processor, as is known in the art, and may also be configured to control the drone 8.

Figure 3:
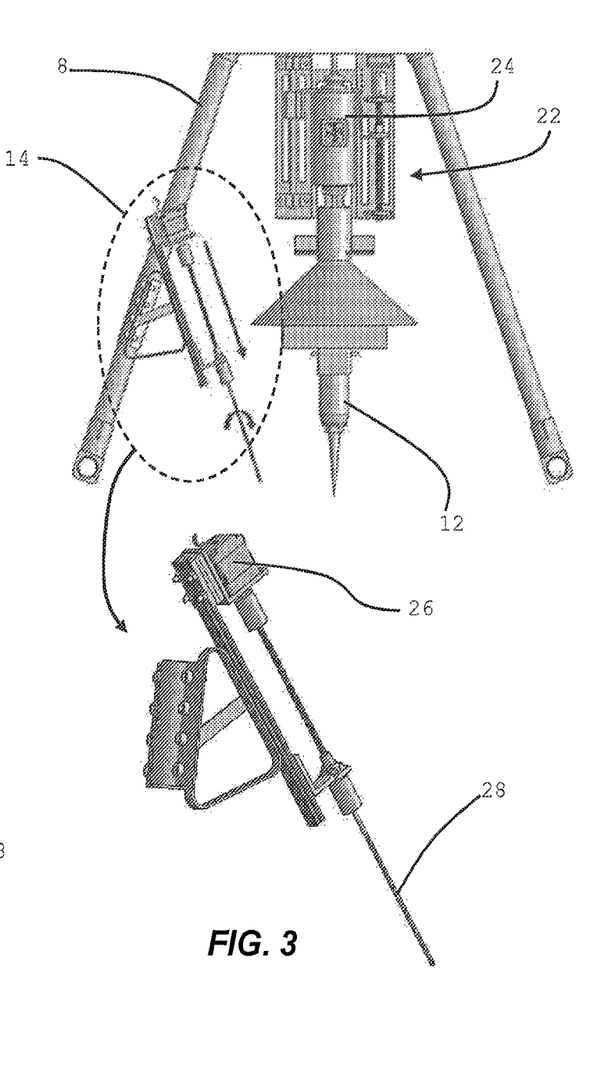
FIG. 3 is diagrammatic representation of the anchor arrangement of the drone geophone installation arrangement of FIG. 1.
Figure 4:
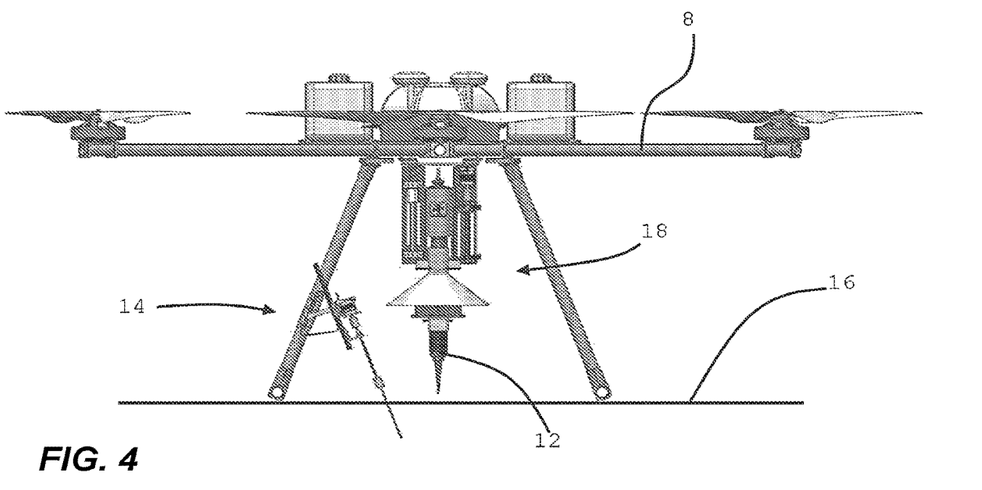
FIG. 4 is a diagrammatic representation of the drone geophone installation arrangement of FIG. 1 anchored to a surface.
Figure 5:
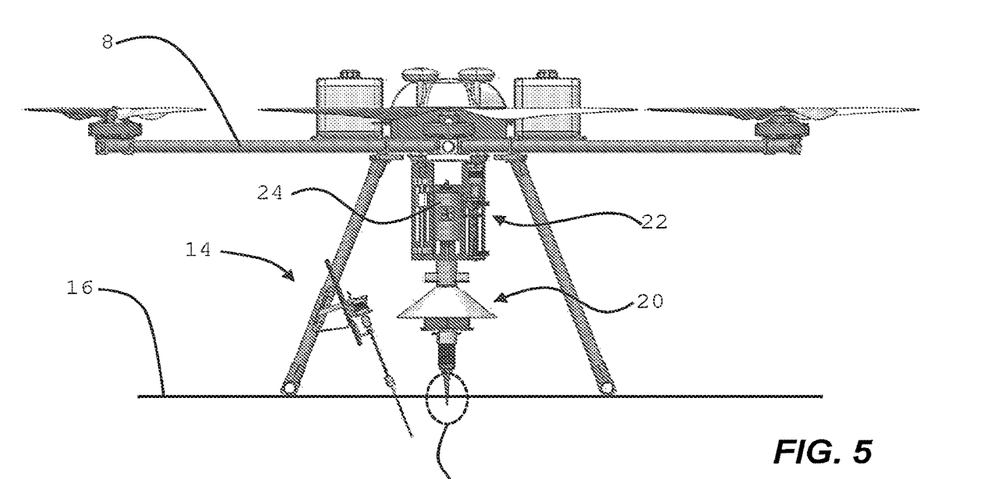
FIG. 5 is a diagrammatic representation of the drone geophone installation arrangement of FIG. 4 showing the implantation of the geophone into the surface.

Arrangement 10 also includes anchor arrangement 14, which is generally configured to selectively and releasably anchor the drone 8 to surface 16. In the exemplified embodiment, the anchor arrangement 14 comprises a deployable drill 26, which is fast with the drone 8 and is configured to deploy and drill a drill bit 28 into the surface 16 in order to anchor the drone 8 to the surface 16. Typically, the drill 26 is configured to drill the drill bit 28 into the surface 16 at an angle relative to a direction along which an implantation pulse is applied by a pulsator 24, as described below, in order to facilitate such anchoring. In an embodiment, the drill angle is between 300 and 60° from the vertical, but variations hereon are possible and within the scope of the disclosure. For example, if an implantation pulse is applied generally vertically, i.e., transverse to the surface 16, drilling into the surface 16 at an angle allows the anchor arrangement 14 to keep the drill in place against such implantation impulse(s).

Figure 1:
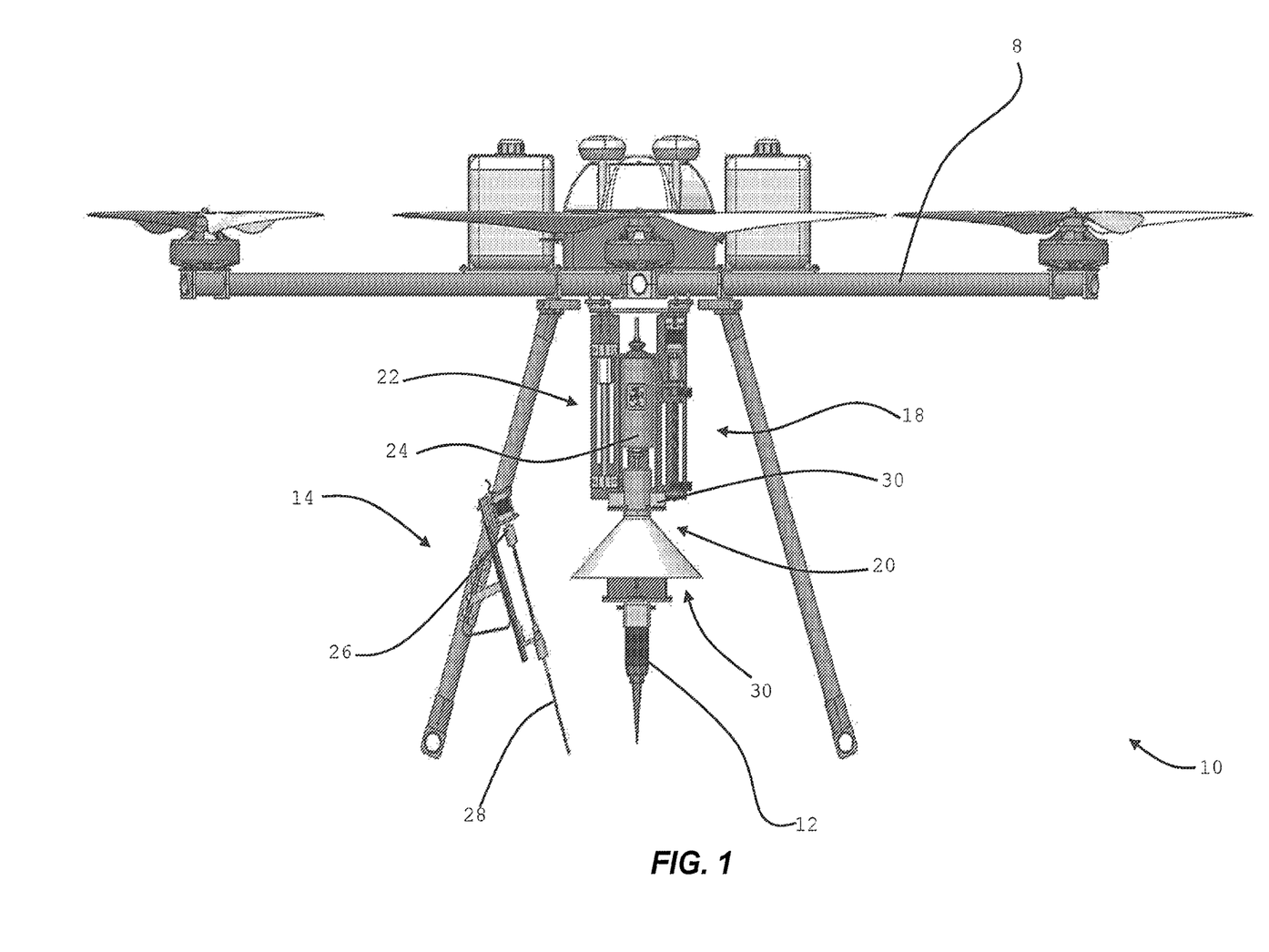
FIG. 1 is a diagrammatic front-view representation of one example of a drone geophone installation arrangement, in accordance with aspects of the disclosure.
Figure 2:
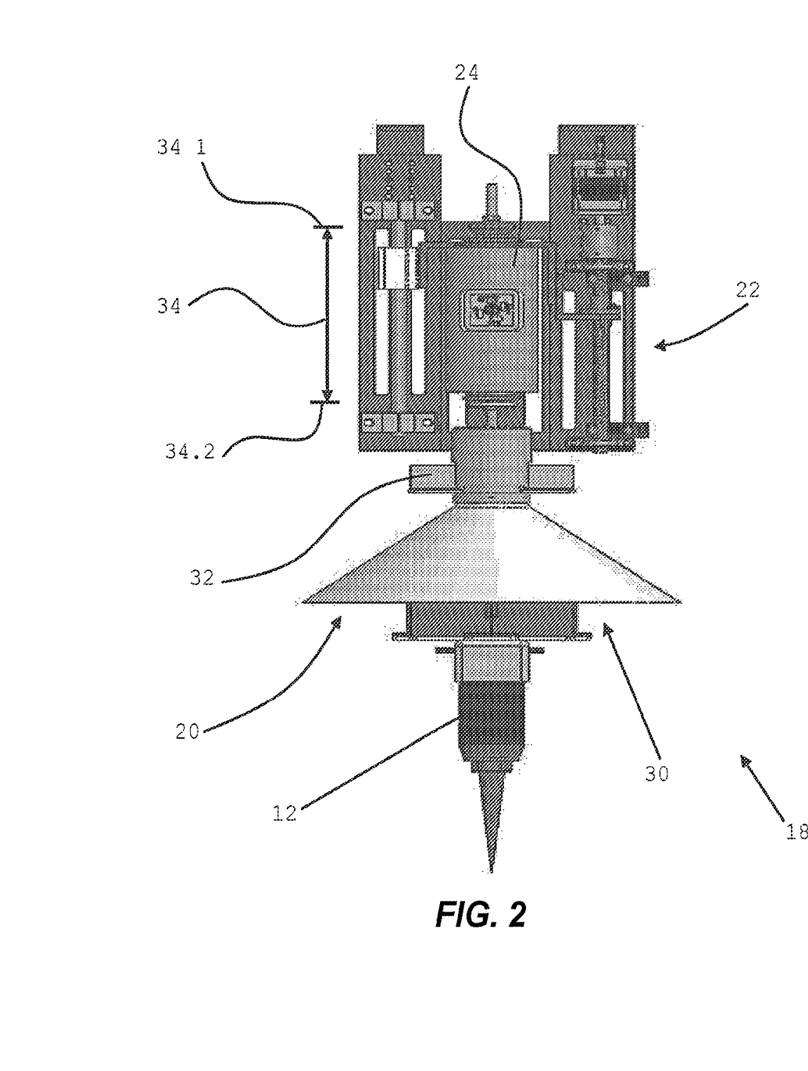
FIG. 2 is a diagrammatic representation of the implantation assembly of the drone geophone installation arrangement of FIG. 1.
Figure 10:
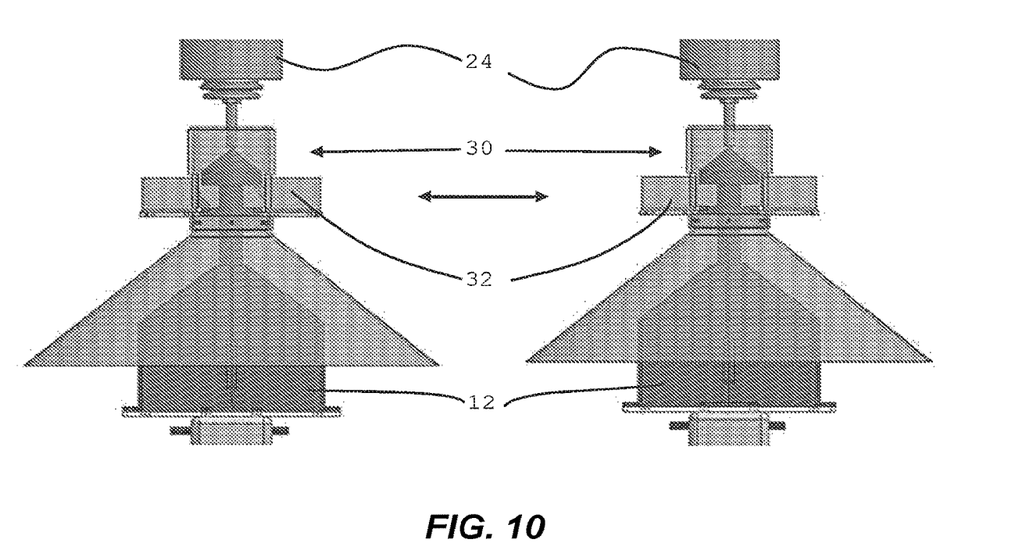
FIG. 10 is a closer-view diagrammatic representations of the geophone receptacle showing a geophone socket with locks.
Figures 11, 12:
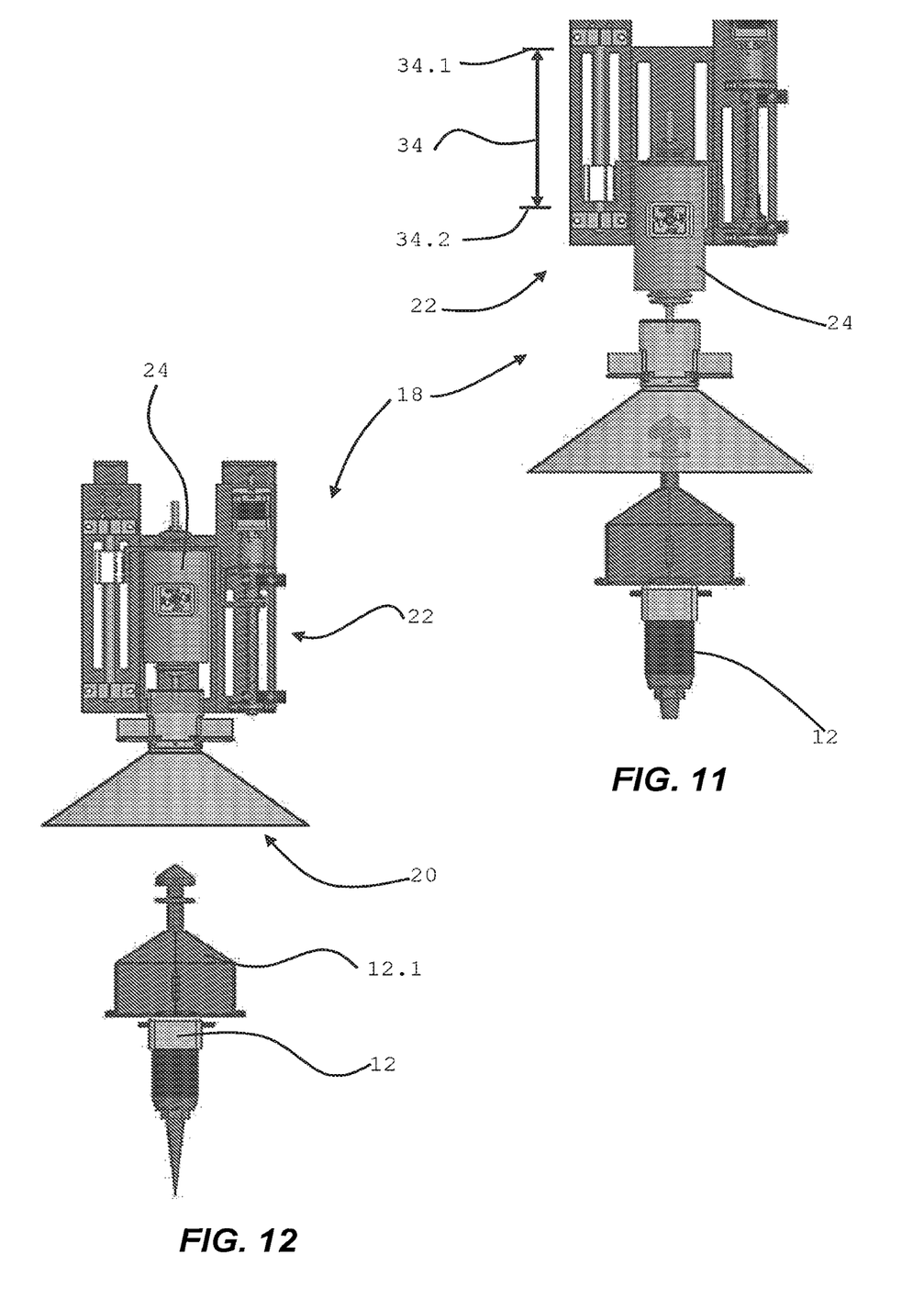
FIGS. 11 and 12 are diagrammatic representations of the geophone implantation assembly of the drone geophone installation arrangement of FIG. 1.

Arrangement 10 further includes geophone implantation assembly 18, which is configured to implant the geophone 12 into the surface 16. The implantation assembly 18 generally comprises a geophone receptacle 20, which is configured to releasably receive the geophone 12. Such geophone receptacle 20 may be shaped and dimensioned according to geophone requirements. The geophone receptacle 20 generally comprises a geophone socket 30, which is shaped and configured to receive a portion of the geophone 12, as shown, the socket 30 including a lock 32, which is configured to releasably lock the portion into the socket 30. Lock 32 may be configured to interact directly with geophone 12, or geophone 12 may be fitted with a particular lock interacting member 12.1, such as a suitable plastic adaptor or cap, or the like.

Implantation assembly 18 also includes a translation carriage 22, which is generally configured to urge the geophone 12 within the geophone receptacle 20 into the surface 16, as well as a pulsator 24, which is configured to apply at least one implantation pulse to the geophone 12 within the geophone receptacle 20 in order to facilitate implantation of the geophone 12 into the surface 16 while the drone 8 is anchored to the surface 16.

The skilled addressee is to appreciate that implantation forces resulting from the urging along with the application of implantation pulses requires offset in order function and not to destabilize drone 8. For this reason, anchor arrangement 14 is typically used to provide a stable platform in the anchored drone 8 against which such implantation forces are able to act to facilitate in implanting of the geophone 12.

The translation carriage 22 generally comprises a linear actuator suspended below the drone 8, as shown, and having a predetermined translation distance 34 determined by means of suitable limit switches and/or sensors, or the like. Such translation carriage 22 typically defines a minimum translation distance 34.1, where the geophone receptacle 20 is proximate the drone 8, and a maximum translation distance 34.2, where the geophone receptacle 20 is distal from the drone 8.

When in use, the translation carriage 22 is generally configured to lower the geophone receptacle 20 with geophone 12 onto or into the surface 16 until a predetermined amount of resistance to such translation occurs, typically sensed by the controller. Once such predetermined amount of resistance to translation occurs or is detected, the pulsator 24 is typically activated in order to percussively "hammer" or force the geophone deeper into the surface 16 via an implantation impulse. In an embodiment, the pulsator 24 comprises a solenoid actuator configured to apply the implantation pulse once activated, but variations hereon are possible and within the scope of the disclosure.

Figure 6:
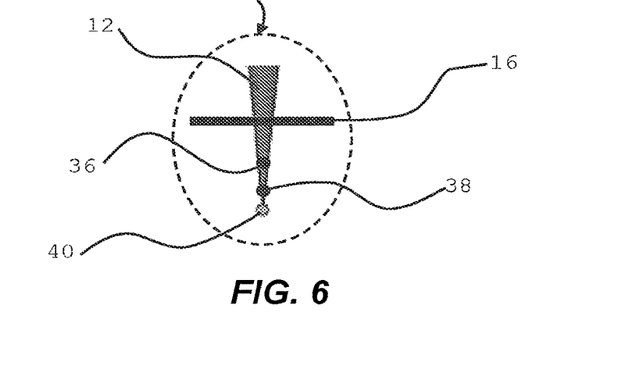
FIG. 6 is a closer-view diagrammatic representation of the geophone implantation into the surface.

An example hereof is shown in FIG. 6, where an implantation end 40 (typically a stake or point of the geophone 12) is urged via translation carriage 22 until the predetermined amount of resistance to such translation occurs at point 36, after which the pulsator 24 is activated to drive point 40 downwards to point 38 via at least one implantation impulse. Once such implantation impulse has been applied, the translation carriage 22 is able to urge the point 40 downwards again until the predetermined amount of resistance to such translation occurs again, at which point the implantation impulse(s) is applied again, driving the geophone 12 sequentially lower into the surface 16 until fully implanted.

Figure 7:
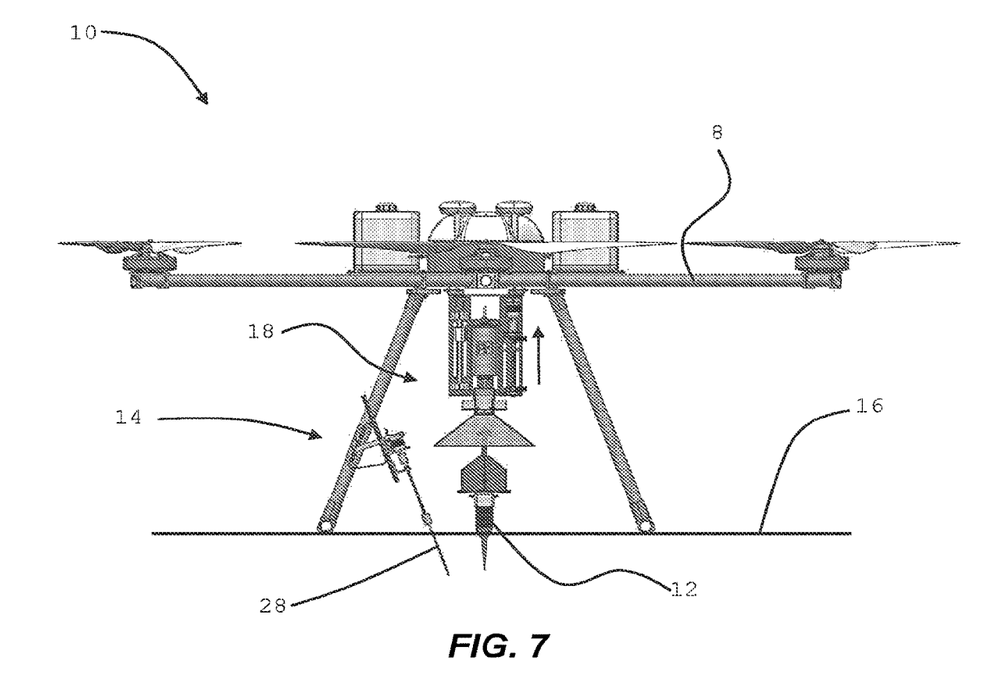
FIG. 7 is a diagrammatic representation of the drone geophone installation arrangement of FIG. 5 showing the geophone fully implanted into the surface.

Accordingly, the translation carriage 22 is typically configured to lower the geophone receptacle 20 with geophone 12 into the surface 16 until the predetermined amount of resistance to translation occurs after each activation of the pulsator, until a maximum translation distance 34.2 is reached, where the geophone 12 is fully implanted as required.

Figure 8:
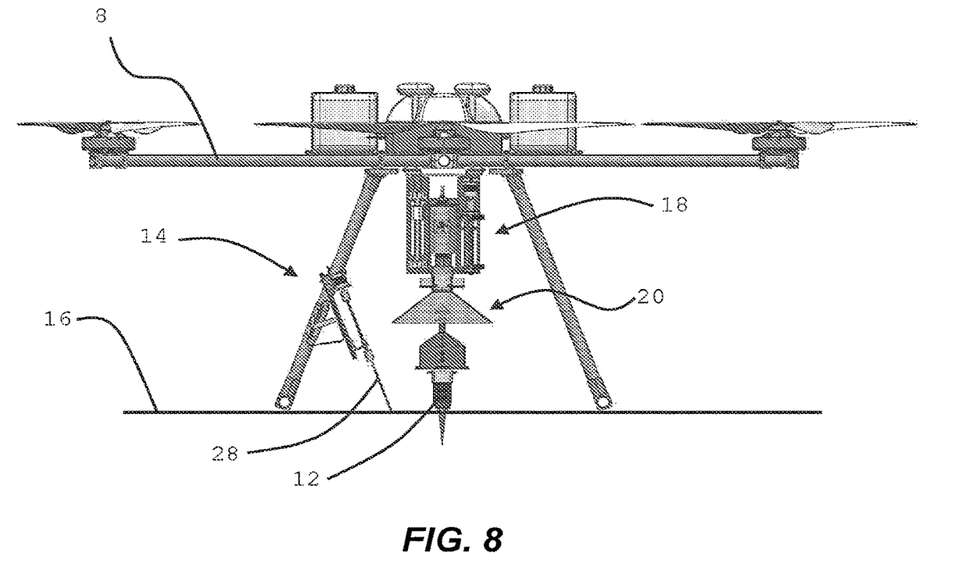
FIG. 8 is a diagrammatic representation of the drone geophone installation arrangement of FIG. 7 showing the implanted geophone with the anchor arrangement released.
Figure 9:
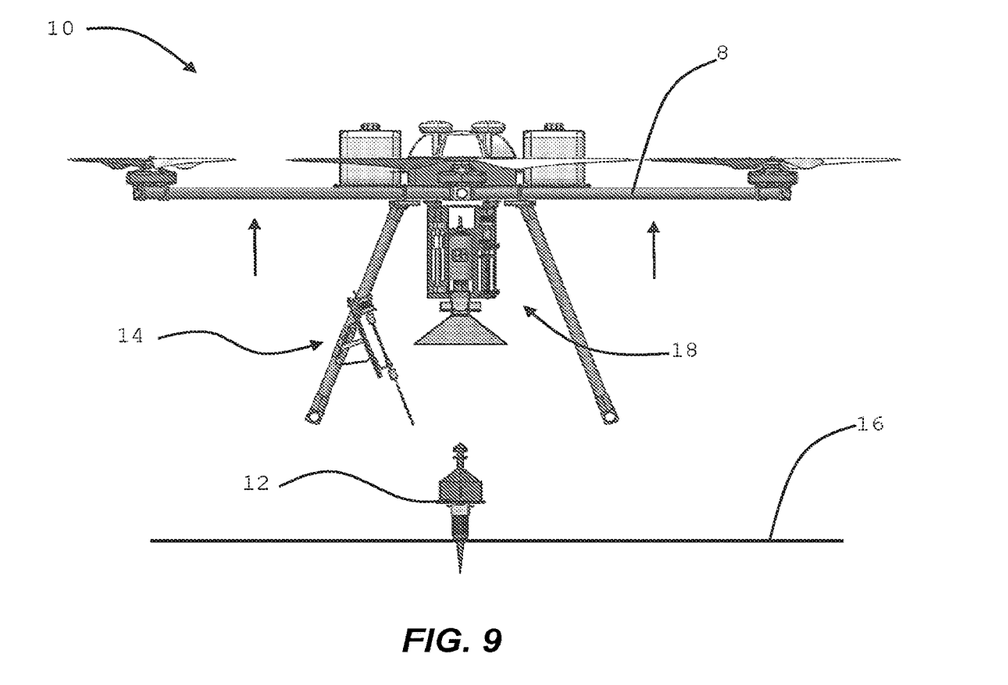
FIG. 9 is diagrammatic representation of the drone geophone installation arrangement of FIG. 8 showing the implanted geophone with the drone departing.

Once implanted, the geophone receptacle 20 is typically configured to release the geophone 12 once the maximum translation distance 34.2 is reached. The translation carriage 22 is also generally configured to retract to the minimum translation distance 34.1 after the geophone 12 is released from the geophone receptacle 20. Similarly, the anchor arrangement 14 is also configured to release the drone 8 from the surface 16 after the geophone 12 is released from the geophone receptacle 20 so that the drone 8 is able to depart.

The disclosure also includes an associated geophone installation method, which generally comprises the steps of providing the drone 8, which is configured to transport the geophone 12; selectively and releasably anchoring the drone 8 to the surface 16 by means of the anchor arrangement 14; urging the geophone 12 into the surface 16 via the translation carriage 22 having the geophone receptacle 20 in which the geophone 12 is received; and applying at least one implantation pulse via the pulsator 24 to the geophone 12 within geophone receptacle 20 as the geophone receptacle 20 is urged into the surface 16. Lastly, the method generally includes the step of releasing the geophone 12 from the geophone receptacle 20 once implanted, as described, so that the drone 8 is able to depart.

In an embodiment, the method may include a step of retrieving the implanted geophone 12 by the drone 8 returning thereto and anchoring the drone with the anchor arrangement 14, receiving the geophone 12 into the geophone receptacle 20, translating the translation carriage 22 with geophone from the maximum 34.2 to minimum 34.1 translation distance, and releasing the drone 8 from the surface 16 so that the drone 8 is able to depart with the geophone 12.

The skilled addressee is to appreciate that, while the disclosure has been exemplified in relation to the implantation of geophones, in particular, the installation arrangement 10 may easily be adapted for the implantation of other things, including other sensors, plants, seeds, etc. Accordingly, variations on the implantation of things via analogous aspects and techniques are expressly included in the scope of the disclosure.

It is believed to be particularly advantageous that the disclosure provides for drone geophone installation arrangement 10, which finds particular application in autonomously deploying a plurality of geophones quickly and efficiently in a desired geographic area, which may be inaccessible, inhospitable and/or difficult to navigate.

Optional embodiments of the disclosure may also be said to broadly consist in the parts, elements and features referred to or indicated herein, individually or collectively, in any or all combinations of two or more of the parts, elements or features, and wherein specific integers are mentioned herein, which have known equivalents in the art to which the disclosure relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a," "an," "the," and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the disclosure, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the disclosure, whilst other aspects are exemplified in a different example. These examples are intended to assist the skilled person in performing the disclosure and are not intended to limit the overall scope of the disclosure in any way unless the context clearly indicates otherwise.

Variations (e.g., modifications and/or enhancements) of one or more embodiments described herein might become apparent to those of ordinary skill in the art upon reading this disclosure. Skilled artisans are expected to employ such variations as appropriate, and it is intended for the claimed subject matter to be practiced other than as specifically described herein.

Any method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A drone geophone installation arrangement, comprising:
   a drone configured to transport a geophone;
   an anchor arrangement configured to selectively and releasably anchor the drone to a surface, the anchor arrangement comprising a deployable drill fast with the drone and configured to deploy and drill a drill bit at a drill angle between 30° and 60° from a substantially vertical direction in which an implantation pulse is applied in order to facilitate anchoring the drone to the surface during geophone implantation; and
   a geophone implantation assembly configured to implant the geophone into the surface, the geophone implantation assembly comprising:
      a geophone receptacle configured to releasably receive the geophone;
      a translation carriage configured to urge the geophone receptacle into the surface; and
      a pulsator configured to apply at least one implantation pulse to the geophone receptacle to facilitate implantation of the geophone into the surface while the drone is anchored thereto, the geophone receptacle configured to release the geophone once a maximum translation distance is reached after which the drone is released from the surface and is able to depart.

2. The drone geophone installation arrangement of claim 1, further comprising a controller arranged in signal communication with the anchor arrangement and the geophone implantation assembly, the controller configured to control synergistic operation of the anchor arrangement and the geophone implantation assembly to control implantation of the geophone into the surface.

3. The drone geophone installation arrangement of claim 1, wherein the drone comprises a multicopter.

4. The drone geophone installation arrangement of claim 1, wherein the geophone receptacle comprises a geophone socket shaped and configured to receive a portion of the geophone, the geophone socket including a lock configured to releasably lock the portion of the geophone into the geophone socket.

5. The drone geophone installation arrangement of claim 1, wherein the translation carriage comprises a linear actuator suspended below the drone and having a translation distance determined through one or more of limit switches and sensors.

6. The drone geophone installation arrangement of claim 1, wherein the translation carriage is configured to lower the geophone receptacle onto the surface until a predetermined amount of resistance to translation occurs.

7. The drone geophone installation arrangement of claim 6, wherein the pulsator is configured to activate once the predetermined amount of resistance to translation occurs.

8. The drone geophone installation arrangement of claim 6, wherein the translation carriage is configured to lower the geophone receptacle onto the surface until the predetermined amount of resistance to translation occurs after each activation of the pulsator, until a maximum translation distance is reached.

9. The drone geophone installation arrangement of claim 1, wherein the pulsator comprises a solenoid actuator configured to apply the at least one implantation pulse once activated.

10. The drone geophone installation arrangement of claim 1, wherein the translation carriage is configured to retract to a minimum translation distance after the geophone is released from the geophone receptacle.

11. The drone geophone installation arrangement of claim 1, wherein the anchor arrangement is configured to release the drone from the surface after the geophone is released from the geophone receptacle following implantation so that the drone is able to depart.

12. A geophone installation method, comprising:
providing a drone configured to transport a geophone;
selectively and releasably anchoring the drone to a surface using an anchor arrangement by way of:
deploying a drill fast with the drone; and
drilling a drill bit into the surface in order to anchor the drone to the surface, the drilling performed at an angle between 30° and 60° relative to a substantially vertical direction in which an implantation pulse is applied in order to facilitate anchoring the drone to the surface during geophone implantation;
urging the geophone into the surface via a translation carriage having a geophone receptacle in which the geophone is received;
applying at least one implantation pulse via a pulsator to the geophone receptacle as the geophone receptacle is urged into the surface while the drone is anchored, the geophone receptacle configured to release the geophone once a maximum translation distance is reached; and
releasing the drone from the surface once the geophone is implanted so that the drone is able to depart.

13. The method of claim 12, wherein the drone comprises a mulicopter.

14. The method of claim 12, wherein urging the geophone into the surface via the translation carriage comprises:
using a linear actuator suspended below the drone and having a translation distance determined through one or more of limit switches and sensors; and
lowering the geophone receptacle onto the surface until a predetermined amount of resistance to translation occurs.

15. The method of claim 14, wherein:
applying at least one implantation pulse comprises activating the pulsator once the predetermined amount of resistance to translation occurs; and
urging the geophone into the surface via the translation carriage comprises lowering the geophone receptacle onto the surface until the predetermined amount of resistance to translation occurs after each activation of the pulsator, until the maximum translation distance is reached.

16. The method of claim 12, further comprising:
retrieving the implanted geophone by the drone returning thereto;
anchoring the drone with the anchor arrangement;
receiving the geophone into the geophone receptacle;
translating the translation carriage with the geophone from the maximum translation distance to a minimum translation distance; and
releasing the drone from the surface so that the drone is able to depart with the geophone.

* * * * *

UNITED STATES PATENT AND TRADEMARK OFFICE
CERTIFICATE OF CORRECTION

PATENT NO. : 12,013,506 B2
APPLICATION NO. : 18/251517
DATED : June 18, 2024
INVENTOR(S) : Farlin Anooz Mohideen It is certified that error appears in the above-identified patent and that said Letters Patent is hereby corrected as shown below:

In the Specification

Column 2, Lines 38-39, change "between 300 and 60°" to --between 30° and 60°--

Column 3, Line 30, change "between 300 and 60°" to --between 30° and 60°--

Column 5, Line 40, change "between 300 and 60°" to --between 30° and 60°--

In the Claims

Claim Heading, Column 8, Line 30, change "The invention claimed is:" to --What is claimed is--

Signed and Sealed this
Thirteenth Day of August, 2024

Katherine Kelly Vidal
*Director of the United States Patent and Trademark Office*